United States Patent
Li et al.

(10) Patent No.: US 10,208,143 B2
(45) Date of Patent: Feb. 19, 2019

(54) POLYETHYLENE POLYMERS, FILMS MADE THEREFROM, AND METHODS OF MAKING THE SAME

(71) Applicant: ExxonMobil Chemical Patents Inc., Baytown, TX (US)

(72) Inventors: Wen Li, Houston, TX (US); Steven A. Best, The Woodlands, TX (US); Robert J. Wittenbrink, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/504,544

(22) PCT Filed: Aug. 14, 2015

(86) PCT No.: PCT/US2015/045179
§ 371 (c)(1),
(2) Date: Feb. 16, 2017

(87) PCT Pub. No.: WO2016/053483
PCT Pub. Date: Apr. 7, 2016

(65) Prior Publication Data
US 2017/0233507 A1    Aug. 17, 2017

Related U.S. Application Data

(60) Provisional application No. 62/059,559, filed on Oct. 3, 2014.

(30) Foreign Application Priority Data

Nov. 25, 2014 (EP) .................................... 14194813

(51) Int. Cl.
| | |
|---|---|
| *C08F 110/02* | (2006.01) |
| *C08J 5/18* | (2006.01) |
| *C08L 23/06* | (2006.01) |
| *C08L 23/04* | (2006.01) |
| *C08L 23/16* | (2006.01) |

(52) U.S. Cl.
CPC .............. *C08F 110/02* (2013.01); *C08J 5/18* (2013.01); *C08L 23/04* (2013.01); *C08L 23/06* (2013.01); *C08L 23/16* (2013.01); *C08J 2323/06* (2013.01); *C08J 2423/06* (2013.01); *C08L 2203/16* (2013.01); *C08L 2205/025* (2013.01)

(58) Field of Classification Search
CPC ........ C08F 110/02; C08J 5/18; C08J 2323/06; C08L 23/04; C08L 23/06; C08L 2423/06; C08L 2203/16; C08L 2205/025
See application file for complete search history.

(56) References Cited

U.S. PATENT DOCUMENTS

| | | | |
|---|---|---|---|
| 6,870,010 B1 | 3/2005 | Lue et al. | |
| 6,969,741 B2 * | 11/2005 | Lustiger | C08L 23/0815 264/310 |
| 7,396,878 B2 * | 7/2008 | Lustiger | C08L 23/06 525/191 |
| 7,951,873 B2 | 5/2011 | Best et al. | |
| 8,796,409 B2 * | 8/2014 | Zhao | C08F 110/02 526/160 |
| 2002/0143123 A1 * | 10/2002 | Dekmezian | C08F 210/16 526/119 |
| 2004/0062942 A1 * | 4/2004 | Lustiger | C08L 23/0815 428/523 |
| 2005/0256271 A1 * | 11/2005 | Lustiger | C08L 23/06 525/240 |
| 2007/0129496 A1 | 6/2007 | Shannon et al. | |
| 2008/0312380 A1 | 12/2008 | Kwalk et al. | |
| 2013/0085244 A1 * | 4/2013 | Zhao | C08F 110/02 526/126 |

FOREIGN PATENT DOCUMENTS

| | | |
|---|---|---|
| WO | WO-2004092459 A1 * | 10/2004 |
| WO | 2013052273 | 4/2013 |
| WO | 2014003923 | 1/2014 |
| WO | 2014042898 | 3/2014 |
| WO | 2014088827 | 6/2014 |

OTHER PUBLICATIONS

ASTM D1238 conditions downloaded from https://plastics.ulprospector.com/properties/ASTMD1238 (Sep. 21, 2017).*

* cited by examiner

Primary Examiner — Irina S Zemel
Assistant Examiner — Jeffrey S Lenihan

(57) ABSTRACT

Disclosed are polyethylene polymers with good melt strength that can provide enhanced properties for compositions including such polyethylene polymers and films made therefrom.

7 Claims, 4 Drawing Sheets

POLYETHYLENE POLYMERS, FILMS MADE THEREFROM, AND METHODS OF MAKING THE SAME

CROSS-REFERENCE TO RELATED APPLICATIONS

This application is a National Stage Application of International Application No. PCT/US2015/045179 filed Aug. 14, 2015 and claims priority to and the benefit of Ser. No. 62/059,559 filed Oct. 3, 2014 and EP 14194813.3 filed Nov. 25, 2014, the disclosures of which are herein incorporated by reference.

FIELD OF THE INVENTION

This invention relates to polyethylene polymers, compositions comprising such polyethylene, and films made therefrom. Methods for making such polyethylene polymers, compositions, and films are also described.

BACKGROUND OF THE INVENTION

Low density polyethylenes (LDPEs) made using a conventional high-pressure process, linear low density polyethylenes (LLDPEs) produced using a Ziegler-Natta catalyst or a metallocene catalyst, other polyethylene polymers made using a metallocene catalyst in a gas phase process, and blends and articles made therefrom, are generally known in the art. While such polyethylenes are sometimes preferred because they provide relatively low-cost solutions to a number of needs, their properties render them less desirable than other polyethylenes for a number of applications. For example, LLDPE and LDPE films generally cannot be produced in high-stalk bubble blown film lines due to a lack of melt strength, and therefore cannot be produced with balanced machine direction (MD)—transverse direction (TD) shrink properties.

Some metallocene LLDPE films provide excellent mechanical properties such as impact and tear resistance but have poor bubble stability during film blowing. Previous attempts to remedy the situation by the addition of long-chain-branched PEs such as LDPE or other branched PEs (U.S. Pat. No. 6,870,010) have resulted in decreased mechanical properties. Some of the blown films blended with branched PE additives additionally suffered from poor optical properties, e.g., the existence of gel particles. Moreover, typical metallocene catalyzed polyethylenes (mPE) are somewhat more difficult to process than LDPE made in a high-pressure polymerization process. Generally, mPEs (which tend to have narrow molecular weight distributions and low levels of branching) require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, mPEs exhibit superior physical properties as compared to LDPEs. In the past, various levels of LDPE have been blended with mPE to increase melt strength, to increase shear sensitivity, i.e., to increase flow at commercial shear rates in extruders, and to reduce the tendency to melt fracture. However, these blends generally have poor mechanical properties as compared with neat mPE. It has been a challenge to improve mPEs processability without sacrificing physical properties.

U.S. Pat. No. 6,870,010 describes a low density substantially linear polyethylene composition, including some that have: (a) a density of 0.935 g/cc or less; (b) a Haze of 10% or less, (c) a Dart Impact of 100 g/mil or more, (d) an average overall long chain branching index of 0.95 or more; and (e) a slice long chain branching (SLCB) index of 0.85 or less for any portion of the composition having a molecular weight of 100,000 or above.

U.S. Pat. No. 7,951,873 discloses blends of linear low density polyethylene copolymers with other linear low density polyethylenes or very low density, low density, medium density, high density, and differentiated polyethylenes. It also includes articles produced from the linear low density polyethylene and polyethylene blends described therein.

International Patent Application WO 2014/042898 provides ethylene-based copolymers, particularly ethylene-based polymers having about 80.0 to 99.0 wt % of polymer units derived from ethylene and about 1.0 to about 20.0 wt % of polymer units derived from one or more $C_3$ to $C_{20}$ α-olefin comonomers; the ethylene-based polymer having a local maximum loss angle at a complex modulus, $G^*$, of $2.50 \times 10^4$ to $1.00 \times 10^6$ Pa and a local minimum loss angle at a complex modulus, $G^*$, of $1.00 \times 10^4$ to $3.00^* \times 10^4$ Pa. This patent application also includes articles, such as films, produced from such polymers and methods of making such articles.

International Patent Application WO 2014/088827 discloses polyethylene compositions comprising one or more ethylene polymers and one or more HDPE modifiers, in particular, this publication further relates to polyethylene blends comprising one or more ethylene polymers and one or more HDPE modifiers, wherein the modifier has: 1) a density of greater than 0.94 g/cc; 2) a $M_w/M_n$ greater than 5; 3) a melt index (ASTM 1238, 190° C., 2.16 kg) of less than 0.7 g/10 min; and 4) a $g^+_{vis}$ of 0.96 or less. Other background references include WO 2013/052273 and WO 2014/003923.

As discussed above, while a lot of efforts have been made to blend LDPE/LLDPE with other ethylene polymers, it is difficult to create one desired blend to combine favorable melt processing properties and optical properties in films made therefrom. There remains a wide need to find an alternative blend partner for LDPE/LLDPE to contribute to both desired toughness and optical properties and improve processability for the films that are produced therefrom. Applicants have found that such objective can be achieved by using an inventive polyethylene polymer catalyzed by a zirconium-based metallocene catalyst, which exhibits remarkably high melt strength resulting from presence of long chain branching and its low melt index. The inventive polyethylene polymer can deliver improved melt strength and strain hardening behavior to its blend with LDPE/LLDPE, leading to simultaneous improvement in both toughness and optical properties of films. Therefore, the inventive composition can be well suited for use in film applications requiring a good balance between toughness and optical properties and can be effective in improving processability in film extrusion process so as to be qualified as a desired candidate to replace conventional blends of LDPE/LLDPE used in shrink films and high-stalk film extrusion process, as well as for applications beyond films, including sheet extrusion, foam and pipe, etc.

SUMMARY OF THE INVENTION

Provided are polyethylene polymers, compositions comprising such polyethylene polymers, and films made therefrom. Methods for making such polyethylene polymers, compositions, and films, are also described.

In a class of embodiments, the invention provides for a method for making a polyethylene polymer comprising the step of contacting a zirconium-based metallocene catalyst with an ethylene monomer to form a polyethylene polymer, wherein the polyethylene polymer has a density of at least about 0.950 g/cm$^3$ and an MI, $I_{2.16}$, of less than about 1 g/10 min.

The polyethylene polymer may further have at least one of the following properties: (i) a melt strength from about 6.00 to about 12.00 cN; (ii) a melting point of at least about 130° C.; (iii) an MWD of about 4.0 to about 5.0; and (iv) an MIR, $I_{21.6}/I_{2.16}$, of about 45 to about 65.

In another class of embodiments of the invention, the invention also provides for a polyethylene polymer, having: (i) a density of about 0.950 g/cm$^3$ to about 0.960 g/cm$^3$; (ii) an MI, $I_{2.16}$, of about 0.15 to about 0.65; (iii) a melt strength of about 6.4 cN to about 11.6 cN; (iv) a melting point of about 130° C. to about 135° C.; (v) an MWD of about 4.1 to about 4.8; and (vi) an MIR, $I_{21.6}/I_{2.16}$, of about 45 to about 65, wherein the polyethylene polymer is an ethylene homopolymer.

In yet another class embodiments of the invention, the invention provides for a method for making a composition, comprising the steps of: combining a first polyethylene polymer having a density of at least about 0.950 g/cm$^3$ and an MI, $I_{2.16}$, of less than about 1 g/10 min with a second polyethylene; and forming the composition; wherein the first polyethylene polymer is prepared by a zirconium-based metallocene catalyst.

Unless otherwise specified, in any of the embodiments described herein, the Melt Strength (cN) of the inventive polyethylene polymer may be from about 6.00 to about 12.00 cN, alternatively, from about 6.40 to about 11.70 cN, and alternatively, from about 6.45 to about 11.65 cN.

Unless otherwise specified, in any of the embodiments described herein, the Melt Index Ratio (MIR), $I_{21.6}/I_{2.16}$, of the inventive polyethylene polymer may be about 45 to about 65, alternatively, about 46 to about 60, and alternatively, about 47 to about 55.

Other embodiments will be apparent in light of the following description and examples.

DETAILED DESCRIPTION OF THE INVENTION

Figure 1:
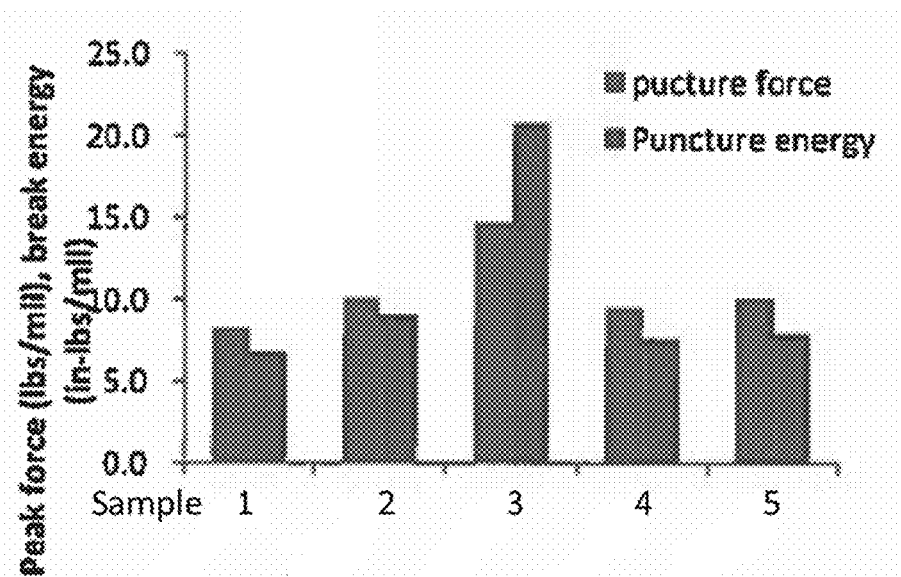
FIG. 1 depicts puncture resistance (puncture force and puncture energy) for each of the film samples in Example 1.

Various specific embodiments, versions of the invention will now be described, including preferred embodiments and definitions that are adopted herein. While the following detailed description gives specific preferred embodiments, those skilled in the art will appreciate that these embodiments are exemplary only, and that the invention can be practiced in other ways. Any reference to the "invention" may refer to one or more, but not necessarily all, of the inventions defined by the claims. The use of headings is for purposes of convenience only and does not limit the scope of the invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene polymer," "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)).

As used herein, when a polymer is referred to as comprising a monomer, the monomer is present in the polymer in the polymerized form of the monomer or in the derivative form of the monomer.

As used herein, when a polymer is said to comprise a certain percentage, wt%, of a monomer, that percentage of monomer is based on the total amount of monomer units in the polymer.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.930 g/cm$^3$, typically from 0.915 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm$^3$ is referred to as a "high density polyethylene" (HDPE).

As used herein, a "second" polyethylene is merely identifiers used for convenience, and shall not be construed as limitation on individual polyethylene, their relative order, or the number of polyethylenes used, unless otherwise specified herein.

As used herein, a composition "free of" a component refers to a composition substantially devoid of the component, or comprising the component in an amount of less than about 0.01 wt %, by weight of the total composition.

Polyethylene Polymers

In one embodiment of the invention, a polyethylene polymer may have a density of at least about 0.950 g/cm$^3$ and a melt index (MI), $I_{2.16}$, of less than about 1 g/10 min, wherein the polyethylene polymer is prepared by a zirconium-based metallocene catalyst. Preferably, the polyethylene polymer further has at least one of the following properties: (i) a melt strength of up to about 12 cN; (ii) a melting point of at least about 130° C.; (iii) a molecular weight distribution (MWD) of about 4.0 to about 5.0; and (iv) a melt index ratio (MIR), $I_{21.6}/I_{2.16}$, of about 45 to about 55.

In another embodiment, a polyethylene polymer may have: (i) a density of about 0.950 g/cm$^3$ to about 0.960 g/cm$^3$; (ii) an MI, $I_{2.16}$, of about 0.15 to about 0.65; (iii) a melt strength of about 6.4 cN to about 11.6 cN; (iv) a melting point of about 130° C. to about 135° C.; (v) an MWD of about 4.1 to about 4.8; and (vi) an MIR, $I_{21.6}/I_{2.16}$, of about 48 to about 54, wherein the polyethylene polymer is an ethylene homopolymer.

The polyethylene polymers described above are herein collectively referred to as "the polyethylene polymer described herein", "the polyethylene polymer of the invention", or "the polyethylene polymer according to the invention".

In one embodiment, the polyethylene polymer described herein has a density of at least about 0.950 g/cm$^3$, preferably from about 0.950 g/cm$^3$ to about 0.970 g/cm$^3$, more preferably from about 0.950 g/cm$^3$ to about 0.960 g/cm$^3$, even more preferably from about 0.953 g/cm$^3$ to about 0.958 g/cm$^3$, as determined based on ASTM D1505 using a density-gradient column on a compression-molded specimen that has been slowly cooled to room temperature (i.e., over a period of 10 minutes or more) and allowed to age for a sufficient time that the density is constant within +/−0.001 g/cm$^3$.

In another embodiment, the polyethylene polymer described herein has an MI, $I_{2.16}$, of less than about 1 g/10 min, preferably from about 0.1 to about 0.7 g/10 min, more preferably from about 0.2 to about 0.6 g/10 min, as measured based on ASTM D1238 (190° C., 2.16 kg).

In a preferred embodiment, the polyethylene polymer described herein further typically has one or more of the following properties:

1. a melt strength of up to about 12 cN, preferably about 6 cN to about 12 cN, more preferably 6.4 cN to about 11.6 cN, as measure using a Gottfert Rheotens tester at a rate of 12 mm/s$^2$ and at an extrusion temperature of 190° C.; and/or
2. a melting point ($T_m$) of at least about 130° C., preferably about 130° C. to about 150° C., preferably about 130° C. to about 140° C., more preferably about 130° C. to about 135° C., as determined based on ASTM D3418-03; and/or
3. an MWD ($M_w/M_n$) of about 4.0 to about 5.0, preferably about 4.1 to about 4.8, more preferably about 4.2 to about 4.7, as measured by size exclusion chromatography; and/or
4. an MIR, $I_{21.6}/I_{2.16}$, of about 45 to about 55, preferably about 46 to about 54, preferably about 48 to about 54; and/or
5. a crystallization temperature ($T_c$) of about 110° C. to about 130° C., preferably 115° C. to 125° C., more preferably 118° C. to about 122° C., as determined based on ASTM D3418-03.

It will be realized that the polyethylene polymer described herein can be utilized alone or admixed with other polyethylene polymers of the class described herein in order to obtain desired properties. In a preferred embodiment, the polyethylene polymer is an ethylene homopolymer, specifically, an HDPE.

The polyethylene polymer according to the invention is prepared by a zirconium-based metallocene catalyst. As used herein, "zirconium-based metallocene catalyst" refers to at least one zirconium atom complexed with at least one ligand, for example, a cyclopentadienyl ligand or for short "Cp" ring, optionally, where two ligands share a common bridge. One way to determine whether a polymer has been polymerized with a zirconium-based metallocene catalyst is to test a post reactor polymer for a residual metallic content or ash. Inventive polymers may have a residual metal content of 5.0 ppm zirconium or less, preferably 2.0 ppm zirconium or less, preferably 1.8 ppm zirconium or less, preferably 1.6 ppm zirconium or less, preferably 1.5 ppm zirconium or less, preferably 1.0 ppm zirconium or less, preferably 0.5 ppm zirconium or less, or preferably 0.25 ppm zirconium or less, (as measured by Inductively Coupled Plasma Emission Spectroscopy (ICPES) run against commercially available standards, where the sample is heated so as to fully decompose all organics and the solvent comprises nitric acid and, if any support is present, another acid to dissolve any support (such as hydrofluoric acid to dissolve silica supports).

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica. Examples of metallocene catalysts/systems for producing polyethylene polymers are generally known in the art. Useful metallocene compounds include bridged and unbridged biscyclopentadienyl zirconium compounds (particular where the Cp rings are indenyl or fluorenyl groups).

The polyethylene polymer described herein can be polymerized using any known process in the art for producing HDPE, such as gas phase, solution or slurry polymerization conditions.

Compositions

In one embodiment of the invention, a composition comprises the polyethylene polymer described herein and a second polyethylene. In one aspect of the invention, the ethylene polymers that can be used as the second polyethylene for the composition described herein are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the second polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second polyethylene is made by the catalysts, activators and processes described in U.S. Pat. Nos. 6,342,566; 6,384,142; and 5,741,563; and International Patent Applications WO 03/040201 and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Ethylene polymers that are useful as the second polyethylene in this invention include those sold by ExxonMobil Chemical Company in Houston Tex., including HDPE, LLDPE, and LDPE; and those sold under the ENABLE™, EXACT™, EXCEED™, ESCORENE™, EXXCO™, ESCOR™, PAXON™, and OPTEMA™ tradenames.

Preferred ethylene homopolymers and copolymers useful as the second polyethylene in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or 2. an $M_w/M_n$ of 1 to 40, preferably 1.6 to 20, or 8 to 25, more preferably 1.8 to 10, more preferably 1.8 to 4, as measured by size exclusion chromatography; and/or 3. a $T_m$ of 30° C. to 150° C., preferably 30° C. to 140° C., preferably 50° C. to 140° C., more preferably 60° C. to 135° C., as determined based on ASTM D3418-03; and/or 4. a crystallinity of 5% to 80%, preferably 10% to 70%, more preferably 20% to 60%, preferably at least 30%, or at least 40%, or at least 50%, as determined based on ASTM D3418-03; and/or 5. a heat of fusion of 300 J/g or less, preferably 1 to 260 J/g, preferably 5 to 240 J/g, preferably 10 to 200 J/g, as determined based on ASTM D3418-03; and/or 6. a $T_c$ of 15° C. to 130° C., preferably 20° C. to 120° C., more preferably 25° C. to 110° C., preferably 60° C. to 125° C., as determined based on ASTM D3418-03; and/or 7. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or 8. a Shore hardness (D scale) of 10 or more, preferably 20 or more, preferably 30 or more, preferably 40 or more, preferably 100 or less, preferably from 25 to 75 (as measured based on ASTM D 2240); and/or 9. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The second polyethylene may be an ethylene homopolymer, such as HDPE. In one embodiment, the ethylene homopolymer has an MWD ($M_w/M_n$) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 g/10 min in one embodiment, and from 0.1 to 100 g/10 min in another embodiment, as measured based on ASTM D1238 (190° C., 2.16 kg).

In a preferred embodiment, the second polyethylene comprises less than 20 mol % propylene units (preferably less than 15 mol %, preferably less than 10 mol %, preferably less than 5 mol %, and preferably 0 mol % propylene units).

In another embodiment of the invention, the second polyethylene useful herein is produced by polymerization of ethylene and, optionally, an alpha-olefin with a catalyst having, as a transition metal component, a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 6,956,088.

In another embodiment of the invention, the second polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the second polyethylene will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful as the second polyethylene in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, low molecular weight polybutadienes (Mw less than 1000 g/mol), and mixtures thereof. Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the ethylene copolymer at up to 10 wt %, preferably at 0.00001 wt % to 2 wt %, preferably 0.002 wt % to 1 wt %, even more preferably 0.003 wt % to 0.5 wt %, based upon the total weight of the ethylene copolymer. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful as the second polyethylene herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradename EXCEED™ Polyethylene or ENABLE™ Polyethylene.

In a class of preferred embodiments, the second polyethylene may have one or more of the following properties:

(a) a density (sample prepared according to ASTM D4703, and the measurement according to ASTM D1505) of about 0.910 to about 0.945 $g/cm^3$, or about 0.912 to about 0.940 $g/cm^3$; and/or (b) an MI, $I_{2.16}$ (ASTM D1238, 2.16 kg, 190° C.), of about 0.1 to about 15 g/10 min, or about 0.5 to about 10 g/10 min, or about 1 to about 5 g/10 min; and/or (c) an MIR, $I_{21.6}$ (190° C., 21.6 kg)/$I_{2.16}$ (190° C., 2.16 kg), of about 10 to about 100, or about 12 to about 90, or about 15 to about 80; and/or (d) a Composition Distribution Breadth Index ("CDBI") of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice; and/or (e) an MWD of about 1.5 to about 5.5; MWD is measured using a gel permeation chromatograph ("GPC") equipped with a differential refractive index ("DRI") detector; and/or (f) a branching index of about 0.5 to about 1.0, or about 0.7 to about 1.0. Branching Index is an indication of the amount of branching of the polymer and is defined as $g'=[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

In a preferred embodiment, the second polyethylene has a melt strength lower than that of the polyethylene polymer described herein.

The second polyethylene is not limited by any particular method of preparation and may be formed using any process known in the art. For example, the second polyethylene may be formed using gas phase, solution, or slurry processes.

In one embodiment, the second polyethylene is formed in the presence of a metallocene catalyst. For example, the second polyethylene may be an mPE produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. mPEs useful as the second polyethylene include those commercially available from ExxonMobil Chemical Company in Houston, Tex., such as those sold under the trade designation EXCEED™.

In particular, the compositions described herein may be physical blends or in situ blends of the polyethylene polymer described herein and a second polyethylene and optionally additional polymers where the ethylene polymer component is the majority component, i.e., greater than 50 wt % of the total weight of the composition. Preferably, the ethylene polymer composition is a blend of the polyethylene polymer described herein and a second polyethylene. Preferably, the second polyethylene is present in an amount of at least about 50 wt %, or at least about 60 wt %, preferably about 65 wt % to about 98 wt %, or about 70 wt % to about 95 wt %, or about 80 wt % to about 90 wt %, based on total weight of polymer in the composition. In a preferred embodiment, the second polyethylene has a melt strength lower than that of the polyethylene polymer described herein.

It has been surprisingly discovered that, by combining the second polyethylene with the polyethylene polymer described herein, particularly at a preferred ratio described herein, superior performance in melt strength and strain hardening behavior of the composition resulted therefrom can be expected, which can thus yield improved processability during the film extrusion process. Preferably, the inventive composition may exhibit at least one of the following improved properties:

(i) a melt strength of up to about 100%, or about 25% to about 100%, or about 50% to about 100%, or about 75% to about 100% higher than that of a composition free of the polyethylene polymer described herein but is otherwise identical in terms of its constituents, as measured using a Gottfert Rheotens tester and represented by the force required to draw a molten polymer extrudate at a rate of 12 mm/s$^2$ and at an extrusion temperature of 190° C. until breakage of the extrudate whereby the force is applied by take up rollers; and (ii) a highest extensional viscosity of at least 3×10$^5$ Pa·s, or at least 4×10$^5$ Pa·s, preferably from about 3×10$^5$ Pa·s to about 9×10$^5$ Pa·s, for example, about 3×10$^5$ Pa·s, about 4×10$^5$ Pa·s, about 5×10$^5$ Pa·s, about 6×10$^5$ Pa·s, about 7×10$^5$ Pa·s, about 8×10$^5$ Pa·s, or about 9×10$^5$ Pa·s, as measured using a SER-2-A Testing Platform available from Xpansion Instruments LLC, Tallmadge, Ohio, USA. The SER Testing Platform was used on a Rheometrics ARES-LS (RSA3) strain-controlled rotational rheometer available from TA Instruments Inc., New Castle, Del., USA. The SER Testing Platform is described in U.S. Pat. Nos. 6,578,413 and 6,691,569.

Films

The polyethylene polymer and the composition described above may be formed into monolayer or multilayer films. These films may be formed by any of the conventional techniques known in the art including extrusion, co-extrusion, extrusion coating, lamination, blowing, and casting.

In accordance with one embodiment of the invention, a film comprises the polyethylene polymer described herein. Preferably, the polyethylene polymer is present in an amount of at least about 50 wt %, for example, ranging from a lower limit of about 50 wt %, about 55 wt %, about 60 wt %, about 65 wt %, or about 70 wt %, to an upper limit of about 80 wt %, about 85 wt %, about 90 wt %, about 95 wt %, or about 100 wt %, based on total weight of polymer in the film. More preferably, the polyethylene polymer is present in an amount of about 100 wt %, based on total weight of polymer in the film.

In a preferred embodiment, the film comprising the polyethylene polymer described herein has at least one of the following properties:

(i) a puncture force of up to about 50% higher, for example, about 5% higher, about 10% higher, about 15% higher, about 20% higher, about 25% higher, about 30% higher, about 35% higher, about 40% higher, about 45% higher, about 50% higher;

(ii) a puncture energy of up to about 200% higher, or up to about 150% higher, or up to about 100% higher, preferably about 10% to about 90% higher, or about 20% to about 80% higher;

Puncture resistance was measured based on ASTM D5748, which is designed to provide load versus deformation response under biaxial deformation conditions at a constant relatively low test speed (change from 250 mm/min to 5 mm/min after reach pre-load (0.1N)). Maximum puncture force is the maximum load achieved by the film sample before the break point. Puncture energy to break is the total energy absorbed by the film sample at the moment of maximum load, which is the integration of the area up to the maximum load under the load-deformation curve; and (iii) a tensile strength of up to about 40% higher, or about 5% to about 40% higher, for example, about 5% higher, about 10% higher, about 15% higher, about 20% higher, about 25% higher, about 30% higher, about 35% higher, or about 40% higher, as measured based on ASTM D882 with static weighing and a constant rate of grip separation using a Zwick 1445 tensile tester with a 200N and defined as the tensile stress at break point during extension test, compared to that of a film comprising a polyethylene polymer having a density of at least about 0.950 g/cm$^3$ and an MI, I$_{2.16}$, of less than about 1 g/10 min and prepared by a catalyst other than a zirconium-based metallocene catalyst, but is otherwise identical in terms of the film composition and the film's thickness.

In another embodiment of the invention, a film comprises the composition described herein. Preferably, the film has at least one of the following properties:

(i) a stiffness (1% Secant Modulus) of at least about 20% higher, preferably about 20% to about 80% higher, for example, about 20% higher, about 30% higher, about 40% higher, about 50% higher, about 60% higher, about 70% higher, or about 80% higher, as determined based on ASTM D790A, where test specimen geometry is as specified under the ASTM D790 section "Molding Materials (Thermoplastics and Thermosets)";

(ii) a puncture force of at least 15% higher, preferably about 15% to about 35% higher, for example, about 15% higher, about 20% higher, about 25% higher, about 30% higher, about 35% higher, as measured by the method described above; and (iii) a haze of at least 50% lower, as measured based on ASTM D1003 using a haze meter Haze-Guard Plus AT-4725 from BYK Gardner and defined as the percentage of transmitted light passing through the bulk of the film sample that is deflected by more than 2.5°, compared to that of a film comprising a composition free of the polyethylene polymer described herein but is otherwise identical in terms of the film composition and the film's thickness.

In multilayer constructions, the film described herein may further comprise additional layer(s) other than the layer comprising the polyethylene polymer or the composition of the invention, which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and nonwovens (particularly polypropylene spunbond fibers or nonwovens), and substrates coated with inks, dyes, pigments, and the like.

In particular, a multilayer film can also include layers comprising materials such as ethylene vinyl alcohol (EVOH), polyamide (PA), or polyvinylidene chloride (PVDC), so as to obtain barrier performance for the film where appropriate.

Additives such as block, antiblock, antioxidants, pigments, fillers, processing aids, UV stabilizers, neutralizers, lubricants, surfactants, and/or nucleating agents may also be present in one or more than one layer in the films. Preferred additives include silicon dioxide, titanium dioxide, polydimethylsiloxane, talc, dyes, wax, calcium stearate, carbon black, low molecular weight resins and glass beads, preferably these additives are present at from 0.1 ppm to 1000 ppm.

In another embodiment, one more layers may be modified by corona treatment, electron beam irradiation, gamma irradiation, or microwave irradiation. In a preferred embodiment, one or both of the surface layers is modified by corona treatment.

The films may vary in thickness depending on the intended application; however, films of a thickness from 1 μm to 250 μm are usually suitable. Films intended for packaging are usually from 10 to 60 micron thick. The thickness of the sealing layer is typically 0.2 μm to 50 μm. There may be a sealing layer on both the inner and outer surfaces of the film or the sealing layer may be present on only the inner or the outer surface. Depending on the film used to prepare the seal, the sealing layer can be used as a monolayer, but more typically will be one layer of a multilayer structure, for example a 10 micron sealing layer with a 30 micron supporting layer.

The films of the invention may be adapted to form flexible packaging films for a wide variety of applications, such as, cling film, low stretch film, non-stretch wrapping film, pallet shrink, over-wrap, agricultural, collation shrink film and laminated films, including stand-up pouches. The film structures that may be used for bags are prepared such as sacks, trash bags and liners, industrial liners, produce bags, and heavy duty bags. The film may be used in flexible packaging, food packaging, e.g., fresh cut produce packaging, frozen food packaging, bundling, packaging and unitizing a variety of products. A package comprising a film described herein can be heat sealed around package content. The film comprising the polyethylene of the invention, particularly in blend with other mPEs, can display both outstanding mechanical properties as demonstrated by improved stiffness and puncture resistance and optical properties such as lower haze in comparison with films in absence of the polyethylene polymer described herein, making it especially suitable for certain packaging applications, such as shrink film packages for heavy duty sacks, and high-stalk film extrusion process due to increased processability.

Methods for Making the Polyethylene Polymers and the Compositions

Also provided are methods for making polyethylene polymers and compositions of the invention. In one embodiment, a method for making a polyethylene polymer may comprise the step of contacting a zirconium-based metallocene catalyst with an olefin comprising ethylene to form a polyethylene polymer, wherein the polyethylene polymer has a density of at least about 0.950 g/cm$^3$ and an MI, $I_{2.16}$, of less than about 1 g/10 min. Preferably, the polyethylene polymer further has at least one of the following properties: (i) a melt strength of up to about 11.6 cN; (ii) a melting point of at least about 130° C.; (iii) an MWD of about 4.0 to about 5.0; and (iv) an MIR, $I_{21.6}/I_{2.16}$, of about 45 to about 55. Preferably, the polyethylene polymer is an ethylene homopolymer. Preferably, the method further comprises the step of forming the polyethylene polymer into a film.

The polyethylene polymer described herein can be polymerized by any of the conventional process known in the art for producing HDPE, such as gas phase, solution or slurry polymerization conditions. A stirred polymerization reactor can be utilized for a batch or continuous process, or the reaction can be carried out continuously in a loop reactor.

In one embodiment, the polymerization occurs in a slurry loop reactor under slurry polymerization conditions. One of ordinary skill in the art, in possession of the present disclosure, can determine the appropriate slurry polymerization conditions. Loop reactors are known in the art, see, for example, U.S. Pat. Nos. 3,248,179; 4,424,341; 4,501,855; 4,613,484; 4,589,957; 4,737,280; 5,597,892; 5,575,979; 6,204,344; 6,281,300; 6,319,997; and 6,380,325.

The polyethylene polymer of the invention is preferably produced in a slurry reactor, such as a stirred slurry reactor or a slurry loop reactor. For illustrative purposes, the methods are described below with particular reference to a slurry loop reactor. However, it should be appreciated that the methods are not limited to this particular polymerization reactor configuration.

A slurry loop olefin polymerization reactor can generally be described as a loop-shaped continuous pipe. One or more fluid circulating devices, such as an axial flow pump, circulate the reactor contents within the pipe in a desired direction so as to create a circulating current or flow of the reactor contents within the pipe. Desirably, the fluid circulating devices are designed to provide high velocity. The loop reactor may be totally or partially jacketed with cooling water in order to remove heat generated by polymerization.

In the slurry loop olefin polymerization reactor, the polymerization medium includes monomer, optional comonomer and minor quantities of other additives, as known in the art, and a hydrocarbon carrier or diluent, advantageously aliphatic paraffin such as propane, butane, isobutane, isopentane, or mixtures thereof. Actual temperature and pressure conditions will depend on various parameters such as the carrier or diluent, as would be known by one of ordinary skill in the art. Additional description is given in numerous patents, including U.S. Pat. Nos. 5,274,056 and 4,182,810 and International Patent Application WO 94/21962.

The slurry loop olefin polymerization reactor may be operated in a single stage process or in multistage processes. In multistage processing, the polymerization of olefins is carried out in two or more polymerization reactors. These polymerization reactors can be configured in series, in parallel, or a combination thereof. U.S. Pat. No. 6,380,325 sets forth a two stage flash process which is a preferred platform to practice the invention.

The polyethylene polymer according to the invention may be produced using a zirconium-based metallocene catalyst treated according to the processes described above by slurry loop polymerization conducted at temperature conditions in the range of about 88° C. to about 110° C. Suitable zirconium-based metallocene catalysts or zirconocenes are available from Univation Technologies, LLC, Houston, Tex., under the tradename XCAT™ EZ 100 Metallocene Catalysts. Examples of zirconium-based metallocene catalysts include ethylene bis(2-methyl indenyl) zirconium dichloride, dimethyl silyl bis(2-methyl indenyl) zirconium dichloride, diphenyl silyl bis(2-methyl indenyl) zirconium dichloride, diphenyl silyl bis(2-methyl, 4-phenyl-indenyl) zirconium dichloride, and diethyl silyl bis(2-methyl, 4-phenyl indenyl) zirconium dichloride. It is preferred that polymerization occur between about 93° C. to about 109° C. and pressures of about 500 to about 650 psig (about 34 bar to about 45 bar). The preferred diluent in a process according to the invention is isobutane.

In another embodiment of the invention, a method for making a composition may comprise the steps of: (a) combining a polyethylene polymer having a density of at least about 0.950 g/cm$^3$ and an MI, $I_{2.16}$, of less than about 1 g/10 min with a second polyethylene; and (b) forming the composition; wherein the polyethylene polymer having a density of at least about 0.950 g/cm$^3$ and an MI, $I_{2.16}$, of less than about 1 g/10 min is prepared by a zirconium-based metallocene catalyst. Preferably, the second polyethylene is present in an amount of at least about 50 wt %, based on total weight of polymer in the composition. Preferably, the second polyethylene has a melt strength lower than that of the polyethylene polymer having a density of at least about 0.950 g/cm$^3$ and an MI, $I_{2.16}$, of less than about 1 g/10 min. Preferably, the method further comprises the step of forming the composition into a film.

The compositions described herein may be formed using conventional equipment and methods, such as by dry blending the individual components and subsequently melt mixing in a mixer, or by mixing the components together directly in a mixer, such as, for example, a Banbury™ mixer, a Haake™ mixer, a Brabender™ internal mixer, or a single or twin-screw extruder, which may include a compounding extruder and a side-arm extruder used directly downstream of a polymerization process. Additionally, additives may be included in the composition, in one or more components of the composition, and/or in a product formed from the composition, such as a film, as desired.

The polyethylenes suitable for use in the invention can be in any physical form when used for mixing. In one embodiment, reactor granules, defined as the granules of polymer that are isolated from the polymerization reactor prior to any processing procedures, are used to mix. The reactor granules typically have an average diameter of from 50 µm to 10 mm in one embodiment, and from 10 µm to 5 mm in another embodiment. In another embodiment, the polymer is in the form of pellets, such as, for example, having an average diameter of from 1 mm to 10 mm that are formed from melt extrusion of the reactor granules.

The components of the composition described herein can be mixed by any suitable means, and are typically mixed to yield an intimately mixed composition which may be a homogeneous, single phase mixture. For example, they may be mixed in a static mixer, batch mixer, extruder, or a combination thereof, that is sufficient to achieve an adequate dispersion of the components.

The mixing step may involve first dry blending using, for example, a tumble blender, where the polymers are brought into contact first, without intimate mixing, which may then be followed by melt mixing in an extruder. Another method of mixing the components is to melt mix the polymer pellets in an extruder or batch mixer. It may also involve a "master batch" approach, where the final concentrations are achieved by combining neat polymers at predetermined ratios. The mixing step may take place as part of a processing method used to fabricate articles, such as in the extruder on an injection molding machine or blown-film line or fiber line.

In a preferred aspect of the invention, the polyethylene polymer described herein and the second polyethylene are "melt mixed" in an apparatus such as an extruder (single or twin screw) or batch mixer. The ethylene polymers may also be "dry blended" using a tumbler, double-cone blender, ribbon blender, or other suitable blender. In yet another embodiment, the ethylene polymers are mixed by a combination of approaches, for example a tumbler followed by an extruder. A preferred method of mixing is to include the final stage of mixing as part of an article fabrication step, such as in the extruder used to melt and convey the composition for an injection molding machine or blown-film line.

In another aspect of the invention, the polymers may also be mixed in solution by any suitable means, by using a solvent that dissolves all polymer components to a significant extent. The mixing may occur at any temperature or pressure where both the polyethylene polymer described herein and the second polyethylene remain in solution. Preferred conditions include mixing at high temperatures, such as 10° C. or more, preferably 20° C. or more over the highest melting point among all the polymers. Such solution mixing would be particularly useful in processes where the polymers are made by solution process and additives are added directly to the finishing train, rather than added to the dry polymers in another mixing step altogether.

Those skilled in the art will be able to determine the appropriate procedure for mixing of the polymers to balance the need for intimate mixing of the component ingredients with the desire for process economy.

In one embodiment of the invention, the films comprising the polyethylene polymer or the composition described herein, monolayer or multilayer, may be formed by using blown techniques, i.e., to form a blown film. For example, the composition can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from about 175° C. to about 225° C. Blown film rates are generally from about 5 to about 30 lbs per hour per inch (about 4.35 to about 26.11 kilograms per hour per centimeter) of die circumference. The finished film can be wound into rolls for later processing. A particular blown film process and apparatus suitable for forming films according to embodiments of the invention is described in U.S. Pat. No. 5,569,693. Of course, other blown film forming methods can also be used.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter which occurs at a height of approximately 5 to 10 times the die diameter above the exit point of the tube from the die. The increase in the tube diameter is accompanied by a reduction of its wall thickness to a final value ranging from approximately 12.7 to 50 microns and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology including the shear sensitivity which determines the maximum output and the melt tension which limits the bubble stability, BUR and take up speed.

A laminate structure with the inventive film prepared as described herein can be formed by lamination to a substrate film.

In a preferred embodiment, the film prepared as described herein comprising the polyethylene polymer described herein has at least one of the following properties: (i) a puncture force of up to about 50% higher; (ii) a puncture energy of up to about 200% higher; and (iii) a tensile strength of up to about 40% higher, compared to that of a film comprising a polyethylene polymer having a density of at least about 0.950 g/cm$^3$ and an MI, $I_{2.16}$, of less than about 1 g/10 min and prepared by a catalyst other than a zirconium-based metallocene catalyst, but is otherwise identical in terms of the film composition and the film's thickness.

In a preferred embodiment, the film as described herein comprising the composition prepared has at least one of the following properties: (i) a stiffness (1% Secant Modulus) of at least about 20% higher; (ii) a puncture force of at least 15% higher; and (iii) a haze of at least 50% lower, compared to that of a film comprising a composition free of the polyethylene polymer having a density of at least about 0.950 g/cm$^3$ and an MI, $I_{2.16}$, of less than about 1 g/10 min but is otherwise identical in terms of the film composition and the film's thickness.

Other embodiments of the invention can include:

Paragraph 1: A method for making a polyethylene polymer comprising the step of contacting a zirconium-based metallocene catalyst with an olefin comprising ethylene to form a polyethylene polymer, wherein the polyethylene polymer has a density of at least about 0.950 g/cm$^3$ and an MI, $I_{2.16}$, of less than about 1 g/10 min.

Paragraph 2: The method of paragraph 1, wherein the polyethylene polymer further has at least one of the following properties: (i) a melt strength of up to about 11.6 cN; (ii) a melting point of at least about 130° C.; (iii) an MWD of about 4.0 to about 5.0; and (iv) an MIR, $I_{21.6}/I_{2.16}$, of about 45 to about 55.

Paragraph 3: The method of paragraph 1 or 2, wherein the polyethylene polymer is an ethylene homopolymer.

Paragraph 4: The method of any of paragraphs 1 to 3, further comprising the step of forming the polyethylene polymer into a film.

Paragraph 5: The method of paragraph 4, wherein the film has at least one of the following properties: (i) a puncture force of up to about 50% higher; (ii) a puncture energy of up to about 200% higher; and (iii) a tensile strength of up to about 40% higher, compared to that of a film comprising a polyethylene polymer having a density of at least about 0.950 g/cm$^3$ and an MI, $I_{2.16}$, of less than about 1 g/10 min and prepared by a catalyst other than a zirconium-based metallocene catalyst, but is otherwise identical in terms of the film composition and the film's thickness.

Paragraph 6: A polyethylene polymer having a density of at least about 0.950 g/cm$^3$ and a melt index (MI), $I_{2.16}$, of less than about 1 g/10 min, wherein the polyethylene polymer is prepared by a zirconium-based metallocene catalyst.

Paragraph 7: The polyethylene polymer of paragraph 6, further having at least one of the following properties: (i) a melt strength of up to about 12 cN; (ii) a melting point of at least about 130° C.; (iii) a molecular weight distribution (MWD) of about 4.0 to about 5.0; and (iv) a melt index ratio (MIR), $I_{21.6}/I_{2.16}$, of about 45 to about 55.

Paragraph 8: The polyethylene polymer of paragraph 6 or 7, wherein the polyethylene polymer is an ethylene homopolymer.

Paragraph 9: A polyethylene polymer, having: (i) a density of about 0.950 g/cm$^3$ to about 0.960 g/cm$^3$; (ii) an MI, $I_{2.16}$, of about 0.15 to about 0.65; (iii) a melt strength of about 6.4 cN to about 11.6 cN; (iv) a melting point of about 130° C. to about 135° C.; (v) an MWD of about 4.1 to about 4.8; and (vi) an MIR, $I_{21.6}/I_{2.16}$, of about 48 to about 54, wherein the polyethylene polymer is an ethylene homopolymer.

Paragraph 10: A film, comprising the polyethylene polymer of any of paragraphs 6 to 9.

Paragraph 11: The film of paragraph 10, wherein the polyethylene polymer is present in an amount of at least about 50 wt %, based on total weight of polymer in the film.

Paragraph 12: The film of paragraph 10 or 11, wherein the polyethylene polymer is present in an amount of about 100 wt %, based on total weight of polymer in the film.

Paragraph 13: The film of any of paragraphs 10 to 12, wherein the film has at least one of the following properties: (i) a puncture force of up to about 50% higher; (ii) a puncture energy of up to about 200% higher; and (iii) a tensile strength of up to about 40% higher, compared to that of a film comprising a polyethylene polymer having a density of at least about 0.950 g/cm$^3$ and an MI, $I_{2.16}$, of less than about 1 g/10 min and prepared by a catalyst other than a zirconium-based metallocene catalyst, but is otherwise identical in terms of the film composition and the film's thickness.

Paragraph 14: A composition, comprising the polyethylene polymer of any of paragraphs 6 to 9 and a second polyethylene.

Paragraph 15: The composition of paragraph 14, wherein the second polyethylene is present in an amount of at least about 50 wt %, based on total weight of polymer in the composition.

Paragraph 16: The composition of paragraph 14 or 15, wherein the second polyethylene has a melt strength lower than that of the polyethylene polymer of any of paragraphs 6 to 9.

Paragraph 17: The composition of any of paragraphs 14 to 16, wherein the composition has at least one of the following properties: (i) a melt strength of up to about 100% higher than that of a composition free of the polyethylene polymer of any of paragraphs 6 to 9 but is otherwise identical in terms of its constituents; and (ii) a highest extensional viscosity of at least $3 \times 10^5$ Pa·s.

Paragraph 18: A film, comprising the composition of any of paragraphs 14 to 17.

Paragraph 19: The film of paragraph 18, wherein the film has at least one of the following properties: (i) a stiffness (1% Secant Modulus) of at least about 20% higher; (ii) a puncture force of at least 15% higher; and (iii) a haze of at least 50% lower, compared to that of a film comprising a composition free of the polyethylene polymer of any of paragraphs 6 to 9 but is otherwise identical in terms of the film composition and the film's thickness.

Paragraph 20: A method for making a composition, comprising the steps of:

(a) combining a polyethylene polymer having a density of at least about 0.950 g/cm$^3$ and an MI, $I_{2.16}$, of less than about 1 g/10 min with a second polyethylene; and (b) forming the composition;

wherein the polyethylene polymer having a density of at least about 0.950 g/cm$^3$ and an MI, $I_{2.16}$, of less than about 1 g/10 min is prepared by a zirconium-based metallocene catalyst.

Paragraph 21: The method of paragraph 20, wherein the second polyethylene is present in an amount of at least about 50 wt %, based on total weight of polymer in the composition.

Paragraph 22: The method of paragraph 20 or 21, wherein the second polyethylene has a melt strength lower than that of the polyethylene polymer having a density of at least about 0.950 g/cm$^3$ and an MI, $I_{2.16}$, of less than about 1 g/10 min.

Paragraph 23: The method of any of paragraphs 20 to 22, further comprising the step of forming the composition into a film.

Paragraph 24: The method of paragraph 23, wherein the film has at least one of the following properties: (i) a stiffness (1% Secant Modulus) of at least about 20% higher; (ii) a puncture force of at least 15% higher; and (iii) a haze of at least 50% lower, compared to that of a film comprising a composition free of the polyethylene polymer having a density of at least about 0.950 g/cm$^3$ and an MI, $I_{2.16}$, of less than about 1 g/10 min but is otherwise identical in terms of the film composition and the film's thickness.

EXAMPLES

The invention, while not meant to be limited by, may be better understood by reference to the following examples and tables.

Example 1

Figure 2:
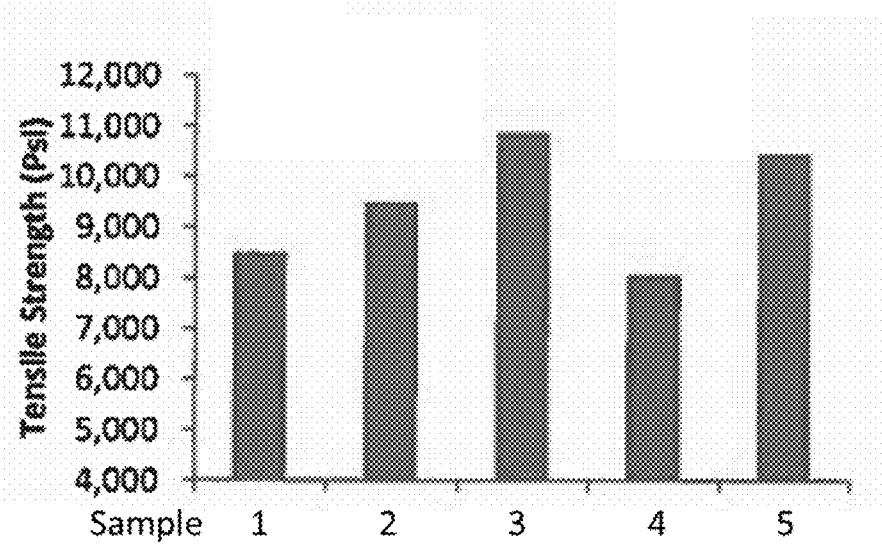
FIG. 2 depicts tensile strength for each of the film samples in Example 1.

Example 1 illustrates puncture resistance and tensile strength demonstrated by three inventive film samples (Samples 1-3) made from 100 wt % of the inventive polyethylene polymers described herein in comparison with two comparative samples (Samples 4 and 5) made from 100 wt % of comparative HDPEs, based on total weight of polymer in the film. PE1, PE2 and PE3 were three samples of the polyethylene polymer described herein used in Samples 1-3, respectively, which were prepared by XCAT™ EZ-100 zirconium-based metallocene catalyst (Univation Technologies, LLC., Houston, Tex., USA) according to the invention with detailed properties as shown in Table 1. ExxonMobil™ HDPE HTA 108 HDPE resin (density: 0.961 g/cm$^3$, MI (190° C./2.16 kg) (ASTM D1238): 0.70 g/10 min, HLMI (190° C./21.6 kg) (ASTM D1238): 46 g/10 min, and MIR $I_{21.6}/I_{2.16}$: 66) (ExxonMobil Chemical Company, Houston, Tex., USA) and ExxonMobil™ HDPE HD 7845.30 HDPE resin (density: 0.958 g/cm$^3$, MI (190° C./2.16 kg) (ASTM D1238): 0.45 g/10 min, HLMI (190° C./21.6 kg) (ASTM D1238): 30 g/10 min, and MIR $I_{21.6}/I_{2.16}$: 67) (ExxonMobil Chemical Company, Houston, Tex., USA) were commercially available HDPEs used in Samples 4 and 5, respectively, both prepared by a Ziegler-Natta catalyst. A 25 µm monolayer structure was prepared for each of the above polyethylene polymer samples on a monolayer blown film line (Gloucester Engineering Co., Inc.). The puncture resistance, as represented by puncture force and puncture energy, and the tensile strength were measured as described herein. The results are depicted in FIGS. 1 and 2.

TABLE 1

Resin Properties of PE1, PE2 and PE3 in Example 1

| Properties | PE1 | PE2 | PE3 |
|---|---|---|---|
| Density (g/cm$^3$) | 0.9570 | 0.9562 | 0.9539 |
| MI (g/10 min) | 0.60 | 0.44 | 0.19 |
| MIR ($I_{21.6}/I_{2.16}$) | 48.3 | 49.9 | 53.7 |
| Melt Strength (cN) | 6.48 | 6.48 | 11.60 |
| $T_m$ (° C.) | 133.9 | 133.9 | 134.7 |
| $T_c$ (° C.) | 119.2 | 119.5 | 120.3 |
| MWD | 4.4 | 4.7 | 4.2 |

As shown in FIGS. 1 and 2, Samples 1-3 of the inventive film made from neat polymers of the inventive polyethylene polymers generally outperformed conventional HDPE (having similar density and MI but non-zirconium-based metallocene catalyzed) based comparative films in puncture resistance and tensile strength. Particularly, without being bound by theory, it is believed that the good melt strength of the polyethylene polymer described herein resulted from its lower MI and presence of long branching contributes to such improvement in neat polymer film properties.

Example 2

Example 2 demonstrates improved melt strength and strain hardening behavior achieved by a composition sample of the inventive composition comprising PE3 in Example 1. Samples 6-9 were prepared using a twin screw extruder by blending 0 wt %, 5 wt %, 10 wt %, and 20 wt %, respectively, of PE3 with EXCEED™ 1018HA mPE resin (density: 0.918 g/cm$^3$, MI: 1.0 g/10 min) (ExxonMobil Chemical Company, Houston, Tex., USA), based on total weight of polymer in the composition, and were tested for melt strength according to the method described herein to show the melt strength varying with PE3 content over the range of 0 wt % to 20 wt %. Sample 8 was selected for test of extensional viscosity according to the method described herein at the strain rates of 0.01 s$^{-1}$, 0.1 s$^{-1}$, and 1.0 s$^{-1}$. The results are depicted in FIGS. 3 and 4.

Figure 3:
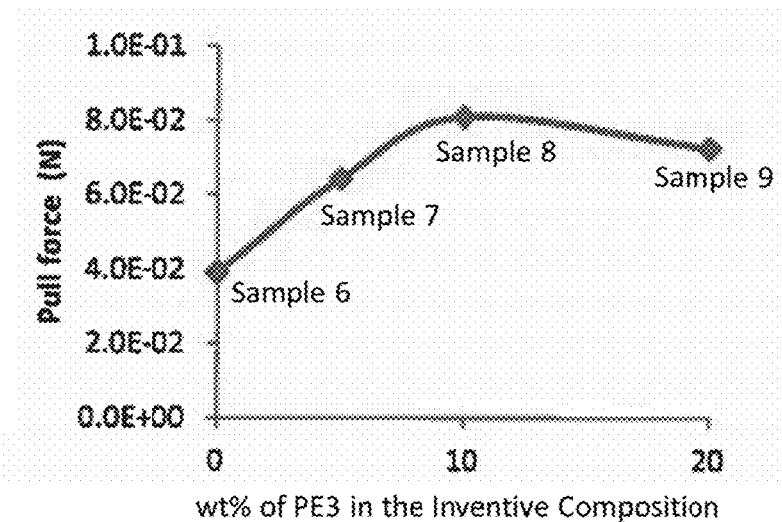
FIG. 3 depicts melt strength for each of the composition samples over a content range of the inventive polyethylene polymer in the composition samples in Example 2.
Figure 4:
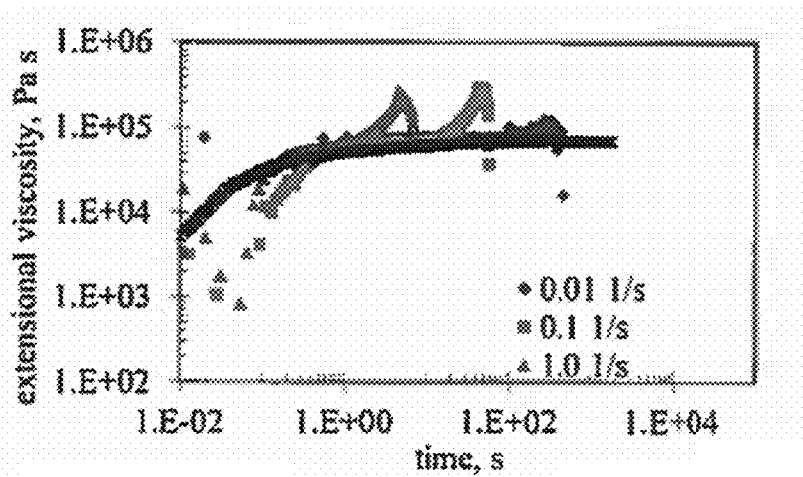
FIG. 4 depicts straining hardening behavior under different strain rates for Sample 8 in Example 2.

It can be expected from FIGS. 3 and 4 that, by reaching a pull force of up to about 100% higher than that of the comparative composition and a highest extensional viscosity of at least 3×10$^5$ Pa·s, addition of the inventive polyethylene polymer into a composition with mPE resin having a lower melt strength as the majority component, especially at some preferred ratio, such as 10 wt % for Sample 8 as shown in FIG. 3, can greatly mitigate the adverse effects mPE resins impose on processability during blown film extrusion without compromising other mechanical properties.

Example 3

Example 3 illustrates the effects of improved properties of the inventive composition in Example 2 on mechanical and optical performance of the films prepared therefrom. PE3, PE1, ExxonMobil™ HDPE HTA 108 HDPE resin, and ExxonMobil™ HDPE HD 7845.30 HDPE resin in Example 1 were selected to each form compositions with EXCEED™ 1018HA mPE resin over a weight percentage range of 0 wt % to 25 wt %, based on total weight of polymer in the composition, and then processed on a Gloucester monolayer blown film line into a 25 μm monolayer film hereby referred to as Sample Series 1-4, respectively. Stiffness as represented by 1% Secant modulus, puncture force and haze were measured according to methods described herein. The results are depicted in FIGS. 5-7.

Figure 5:
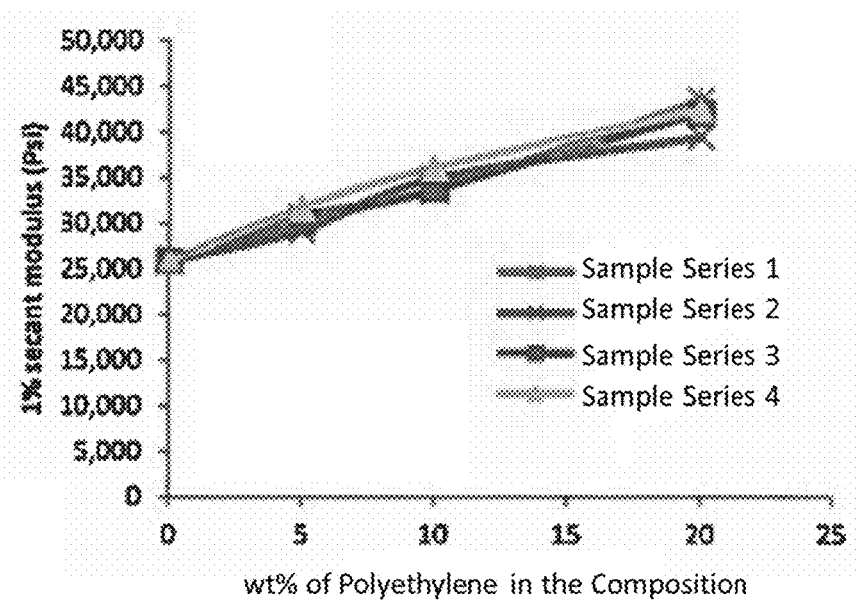
FIG. 5 depicts stiffness (1% Secant Modulus) over a content range of the inventive polyethylene polymer in the composition for each of the film sample series in Example 3.
Figure 6:
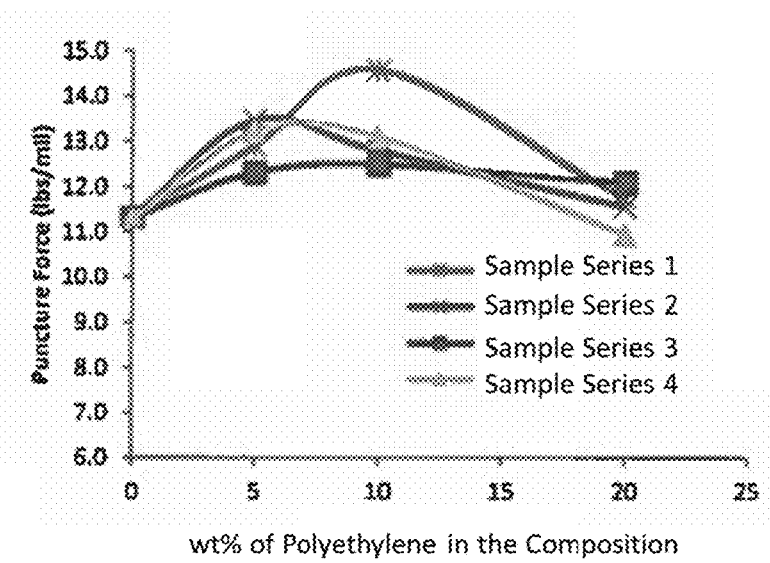
FIG. 6 depicts puncture resistance over a content range of the inventive polyethylene polymer in the composition for each of the film sample series in Example 3.
Figure 7:
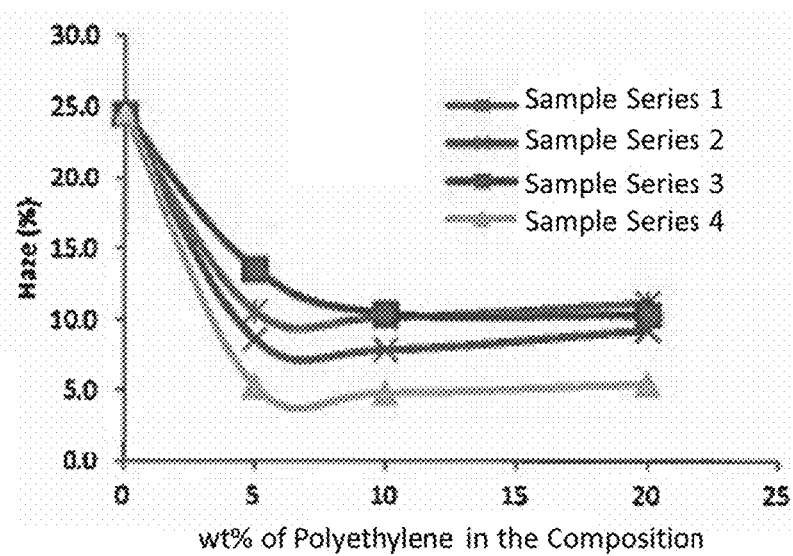
FIG. 7 depicts haze over a content range of the inventive polyethylene polymer in the composition for each of the film sample series in Example 3.

Results in FIGS. 5-7 indicate that, compared to a composition free of the polyethylene polymer described herein, the inventive composition comprising the polyethylene polymer described herein can lead to a film excelling in well-balanced improvement in toughness and clarity, providing strong down-gauging potential for the inventive films. It can also be noted that while showing a roughly even level of stiffness with the comparative films made from compositions comprising a conventional HDPE, the sample series made from the inventive compositions achieved a higher puncture resistance and a lower haze. This combination of desired toughness and clarity can render a promising candidate to replace the current conventional blends of LDPE/LLDPE for use in a broad range of applications, including shrink films and high-stalk film extrusion process as well as applications beyond films.

Example 4

Example 4 shows improvement in multiple properties demonstrated by a three-layer high-stalk film sample (Sample 10) with a core layer made from 100 wt % of the inventive polyethylene polymers described herein in comparison with a comparative sample (Sample 11) with the same layer made from 100 wt % of a comparative HDPE, based on total weight of polymer in the core layer. A three-layer A/Y/A structure of 50 μm was prepared for both samples on a high-stalk multilayer blown film line (Hosokawa Alpine Aktiengesellschaft, Germany) at a layer thickness ratio of 1:3:1. EXCEED™ 1018HA mPE resin was used in an amount of 100 wt % in two outer layers (based on total weight of polymer in the outer layer) of both samples. PE3 was used in the core layer (between the two outer layers) of Sample 10. ExxonMobil™ HDPE HTA 108 resin was used in the core layer of Sample 11.

Elmendorf tear strength was measured based on ASTM D1922-09 using the Tear Tester 83-11-01 from TMI Group of Companies and measures the energy required to continue a pre-cut tear in the test sample. Samples were cut across the web using the constant radius tear die and were free of any visible defects (e.g., die lines, gels, etc.).

Dart impact was measured by a method following ASTM D1709 on a Dart Impact Tester Model C from Davenport Lloyd Instruments in which a pneumatically operated annular clamp is used to obtain a uniform flat specimen and the dart is automatically released by an electro-magnet as soon a sufficient air pressure is reached on the annular clamp. A dart with a 38.10±0.13 mm diameter hemispherical head dropped from a height of 0.66±0.01 m was employed. Dart impact measures the energy causing a film to fail under specified conditions of impact of a freely-falling dart. This energy is expressed in terms of the weight (mass) of the dart falling from a specified height, which would result in 50% failure of tested samples.

Shrinkage was measured based on ASTM D1204-08 on a heat-resistant tile where a round film sample with a 100 mm diameter is placed and heated by a Master Heat Gun Model HG-501A (Master Appliance Corp., Wisconsin, USA) until bubbles in the film flatten out and the sample is smooth. The shrinkage is determined in both MD and TD, reported in %.

The puncture resistance, as represented by puncture force and puncture energy, the tensile strength, and the haze were measured as described herein. The results are listed Table 2.

The observed improvement in all the tested properties again demonstrate great potential of the inventive polyethylene polymer in shrink films and high-stalk film extrusion process as a better suited alternative to conventional HDPEs.

TABLE 2

Film Properties of Samples 10 and 11 in Example 4

| Properties | Sample 10 | Sample 11 |
|---|---|---|
| Tensile Strength (psi) | | |
| MD | 7,817 | 7,622 |
| TD | 8,231 | 5,198 |
| Elmendorf Tear | | |
| MD (g) | 103 | 51 |
| TD (g) | 186 | 702 |
| MD (g/mil) | 52 | 26 |
| TD (g/mil) | 95 | 355 |
| Haze (%) | 12.0 | 16.6 |
| Dart Impact | | |
| (g) | 144 | 79 |
| (g/mil) | 73 | 42 |
| Puncture | | |
| Peak Force (lbs) | 26.7 | 22.2 |
| Peak Force (lbs/mil) | 13.6 | 11.7 |
| Break Energy (in-lbs) | 54.5 | 46.2 |
| Break Energy (in-lbs/mil) | 27.8 | 24.3 |

TABLE 2-continued

Film Properties of Samples 10 and 11 in Example 4

| Properties | Sample 10 | Sample 11 |
|---|---|---|
| Shrinkage (%) | | |
| MD | 78 | 77 |
| TD | 21 | 0 |

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A composition comprising:
    (a) a first polyethylene polymer, having: (i) a density of 0.950 g/cm$^3$ to about 0.960 g/cm$^3$; (ii) an MI, $I_{2.16}$, of about 0.15 to about 0.65; (iii) a melt strength of about 6.4 cN to about 11.6 cN; (iv) a melting point of about 130° C. to about 135° C.; (v) an MWD of about 4.1 to about 4.8; and (vi) an MIR, $I_{21.6}/I_{2.16}$, of about 45 to about 65, wherein the polyethylene polymer is an ethylene homopolymer; and
    (b) a second polyethylene having a melt strength lower than that of the first polyethylene polymer, wherein the second polyethylene is present in an amount of at least about 50 wt %, based on total weight of polymer in the composition.
2. The composition of claim 1, wherein the composition has at least one of the following properties: (i) a melt strength of up to about 100% higher than that of a composition free of the first polyethylene polymer of claim 1 but is otherwise identical in terms of its constituents; and (ii) a highest extensional viscosity of at least 3×10$^5$ Pa·s.
3. The composition of claim 1, wherein the second polyethylene is present in an amount from about 65 wt % to about 98 wt %, based on total weight of polymer in the composition.
4. The composition of claim 1, wherein the second polyethylene is present in an amount from about 80 wt % to about 90 wt %, based on total weight of polymer in the composition.
5. The composition of claim 1, wherein the second polyethylene is a metallocene polyethylene.
6. A film, comprising the composition of claim 1.
7. The film of claim 6, wherein the film has at least one of the following properties: (i) a stiffness (1% Secant Modulus) of at least about 20% higher; (ii) a puncture force of at least 15% higher; and (iii) a haze of at least 50% lower, compared to that of a film comprising a composition free of a polyethylene polymer, having: (i) a density of 0.950 g/cm$^3$ to about 0.960 g/cm$^3$; (ii) an MI, $I_{2.16}$, of about 0.15 to about 0.65; (iii) a melt strength of about 6.4 cN to about 11.6 cN; (iv) a melting point of about 130° C. to about 135° C.; (v) an MWD of about 4.1 to about 4.8; and (vi) an MIR, $I_{21.6}/I_{2.16}$, of about 45 to about 65, wherein the polyethylene polymer is an ethylene homopolymer but is otherwise identical in terms of the film composition and the film's thickness.

* * * * *